(12) United States Patent
Ashida et al.

(10) Patent No.: US 11,639,149 B2
(45) Date of Patent: May 2, 2023

(54) FLAME-RESISTANT AIRBAG, METHOD OF MANUFACTURING FLAME-RESISTANT AIRBAG, AND ADDITION-CURABLE LIQUID SILICONE RUBBER COMPOSITION FOR FLAME-RESISTANT AIRBAGS

(71) Applicant: SHIN-ETSU CHEMICAL CO., LTD., Tokyo (JP)

(72) Inventors: Ryo Ashida, Annaka (JP); Hidenori Mizushima, Annaka (JP); Shigeru Ubukata, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 763 days.

(21) Appl. No.: 16/494,139

(22) PCT Filed: Feb. 16, 2018

(86) PCT No.: PCT/JP2018/005389
§ 371 (c)(1),
(2) Date: Sep. 13, 2019

(87) PCT Pub. No.: WO2018/168315
PCT Pub. Date: Sep. 20, 2018

(65) Prior Publication Data
US 2020/0070764 A1 Mar. 5, 2020

(30) Foreign Application Priority Data
Mar. 15, 2017 (JP) .............................. JP2017-050107

(51) Int. Cl.
| | | |
|---|---|---|
| *B60R 21/235* | (2006.01) | |
| *B01J 31/12* | (2006.01) | |
| *C09D 183/04* | (2006.01) | |
| *D06M 15/643* | (2006.01) | |
| *D06N 3/12* | (2006.01) | |
| *C08K 3/36* | (2006.01) | |

(52) U.S. Cl.
CPC ............. *B60R 21/235* (2013.01); *B01J 31/12* (2013.01); *C09D 183/04* (2013.01); *D06M 15/643* (2013.01); *D06N 3/128* (2013.01); *B60R 2021/23514* (2013.01); *B60R 2021/23533* (2013.01); *C08K 3/36* (2013.01); *C08L 2201/02* (2013.01); *D06M 2200/30* (2013.01); *Y10T 442/2631* (2015.04)

(58) Field of Classification Search
CPC ....... C08L 83/00; C08L 2201/02; C08K 3/36; C08K 5/56; C09D 183/06; C09D 5/18; B60R 2021/23514; B60R 2021/23533; B60R 21/235; C08G 77/12; C08G 77/20; D06M 15/643; D06M 2200/30; D06N 3/128; Y10T 442/2631; B01J 31/12
See application file for complete search history.

(56) References Cited

U.S. PATENT DOCUMENTS

| | | |
|---|---|---|
| 5,658,674 A | 8/1997 | Lorenzetti et al. |
| 6,425,600 B1 | 7/2002 | Fujiki et al. |
| 2006/0286390 A1 | 12/2006 | Yaginuma et al. |
| 2011/0064882 A1 | 3/2011 | Mizushima et al. |

FOREIGN PATENT DOCUMENTS

| | | |
|---|---|---|
| EP | 0663468 A1 | 7/1995 |
| EP | 0681014 A1 | 11/1995 |
| JP | 7-195990 A | 8/1995 |
| JP | 2001-164187 A | 6/2001 |
| JP | 2006-348410 A | 12/2006 |
| JP | 2010-53493 A | 3/2010 |
| JP | 2011-80037 A | 4/2011 |
| JP | 2013-209517 A | 10/2013 |

OTHER PUBLICATIONS

International Search Report, issued in PCT/JP2018/005389, PCT/ISA/210, dated Apr. 24, 2018.
Written Opinion of the International Searching Authority, issued in PCT/JP2018/005389, PCT/ISA/237, dated Apr. 24, 2018.
Extended European Search Report, dated Dec. 15, 2020, for European Application No. 18766765.4.

*Primary Examiner* — Arti Singh-Pandey
(74) *Attorney, Agent, or Firm* — Birch, Stewart, Kolasch & Birch, LLP

(57) ABSTRACT

Provided is a flame-resistant airbag having a low rate of combustion. The flame-resistant airbag is obtained by forming, on a cloth substrate, a cured film of a composition containing: (A) 100 parts by mass of a liquid organopolysiloxane containing an alkenyl group bonded to a silicon atom; (B) 5 to 100 parts by mass of a three-dimensional network-structured organopolysiloxane resin in which 0.05 to 0.15 mol/100 g alkenyl groups are bonded only to D units, the ratio of M units to T and/or Q units is 0.65 to 1.40, and hydroxyl group content is 0.040 mol/100 g or less; (C) 0.1 to 50 parts by mass micropulverized silica having a specific surface area of at least 50 m²/g; (D) an organohydrogenpolysiloxane comprising a hydrogen atom bonded to a silicon atom, in an amount such that the number of hydrogen atoms bonded to silicon atoms in component (D) is 1 to 10 per total 1 alkenyl group bonded to a silicon atom in components (A) and (B); (E) an effective amount of a platinum group metal catalyst; and (F) 0.1 to 10 parts by mass of an organic silicon compound. The composition is applied in an amount of 5 to 150 g/m².

11 Claims, No Drawings

FLAME-RESISTANT AIRBAG, METHOD OF MANUFACTURING FLAME-RESISTANT AIRBAG, AND ADDITION-CURABLE LIQUID SILICONE RUBBER COMPOSITION FOR FLAME-RESISTANT AIRBAGS

TECHNICAL FIELD

The present invention relates to a flame-resistant airbag having the excellent low combustion rate properties specified in Federal Motor Vehicle Safety Standard (FMVSS) No. 302 and an excellent mechanical strength, a method of manufacturing flame-resistant airbags, and an addition-curable liquid silicone rubber composition for flame-resistant airbags.

BACKGROUND ART

Silicone rubber compositions for use in airbags and whose purpose is to form a rubber film on a textile surface have hitherto been described. Airbags having a silicone rubber film possess an excellent flame resistance, and therefore are suitably used as airbags in automobiles and the like.

Examples of such airbags that are disclosed in the art include an airbag in which a textile surface is covered with a liquid silicone rubber composition that includes a SiH group-containing organohydrogenpolysiloxane of a specific structure as a crosslinking agent, an organosilicon compound having on the molecule an epoxy group and a silicon-bonded alkoxy group as an adhesion-promoting ingredient, and a titanium compound or a zirconium compound or both (JP-A 2011-080037; Patent Document 1), and an airbag in which a textile surface is covered with a liquid silicone composition that contains a resinous polysiloxane and is prepared by premixing the siloxane ingredient together with silica, a surface treatment agent and water (JP-A 2013-209517; Patent Document 2). In addition, an airbag which, by covering a textile surface with a liquid silicone rubber composition obtained by adding a reinforcing silica fine powder and aluminum hydroxide to an addition-curable composition, possesses the excellent combustion rate specified in FMVSS No. 302 and a low surface tack has also been disclosed (JP-A 2010-053493; Patent Document 3).

However, a drawback of all of these airbags is that they have difficulty addressing the strong need recently for low combustion rate properties. In particular, they are unable to satisfy such low combustion rate requirements in response to the market demand in recent years for low coating weights of liquid silicone rubber composition on the base fabric. Moreover, because the cured forms of these liquid silicone rubber compositions have low mechanical properties, airbags obtained by covering textile surfaces with such compositions also have a low mechanical strength.

PRIOR ART DOCUMENTS

Patent Documents

Patent Document 1: JP-A 2011-080037
Patent Document 2: JP-A 2013-209517
Patent Document 3: JP-A 2010-053493

SUMMARY OF INVENTION

Technical Problem

The present invention was arrived at in light of the above circumstances. The object of this invention is to provide a flame-resistant airbag having the excellent low combustion rate properties specified in FMVSS No. 302 and an excellent mechanical strength, a method of manufacturing flame-resistant airbags, and an addition-curable liquid silicone rubber composition for flame-resistant airbags.

Solution to Problem

The inventors have conducted extensive investigations in order to achieve this object. As a result, they have discovered that, in a liquid silicone rubber composition containing the subsequently described components (A) to (F) as essential ingredients, by including in particular component (B) a specific amount of a three-dimensional network-type organopolysiloxane resin in which from 0.05 to 0.15 mol/100 g of alkenyl groups are bonded solely to D units, the ratio of M units to T and/or Q units (M units/T and/or Q units) is from 0.65 to 1.40 and the amount of hydroxyl groups is 0.040 mol/100 g or less, an airbag obtained by coating a specific amount of this liquid silicone rubber composition onto the surface of an airbag base fabric and heat-curing the composition has the excellent low combustion rate properties specified in FMVSS No. 308 and also has an excellent mechanical strength. This discovery ultimately led to the present invention.

Accordingly, the invention provides the following flame-resistant airbag, method of manufacturing flame-resistant airbags, and addition-curable liquid silicone rubber composition for flame-resistant airbags.

[1]

A flame-resistant airbag obtained by forming, on at least one side of an airbag base fabric, a cured film of an addition-curable liquid silicone rubber composition having a coating weight of 5 to 150 g/m$^2$, which composition includes:

(A) 100 parts by weight of an organopolysiloxane which includes at least two silicon-bonded alkenyl groups of 2 to 8 carbon atoms per molecule and is liquid at 25° C.;

(B) from 5 to 100 parts by weight of a three-dimensional network-type organopolysiloxane resin in which from 0.05 to 0.15 mol/100 g of alkenyl groups are bonded solely to difunctional $R^1R^2SiO_{2/2}$ units (D units; in the formula, $R^1$ is an alkenyl group of 2 to 8 carbon atoms and $R^2$ is a group selected from alkyl groups of 1 to 8 carbon atoms, alkenyl groups of 2 to 8 carbon atoms and aryl groups of 6 to 12 carbon atoms), in which the ratio (M units/T and/or Q units) of monofunctional $R^3_3SiO_{1/2}$ units (M units; in the formula, each $R^3$ is independently a group selected from alkyl groups of 1 to 8 carbon atoms and aryl groups of 6 to 12 carbon atoms) to branched siloxane units which are trifunctional $R^3SiO_{3/2}$ units (T units; in the formula, $R^3$ is the same as above) and/or tetrafunctional $SiO_{4/2}$ units (Q units) is from 0.65 to 1.40, and in which the amount of hydroxyl groups is 0.040 mol/100 g or less;

(C) from 0.1 to 50 parts by weight of a silica fine powder having a specific surface area according to the BET method of at least 50 m$^2$/g;

(D) an organohydrogenpolysiloxane containing at least two silicon-bonded hydrogen atoms per molecule, in an amount such that the number of silicon-bonded hydrogen atoms included on a molecule of component (D) per silicon-bonded alkenyl group in components (A) and (B) combined is from 1 to 10;

(E) an effective amount of a platinum family metal catalyst as a hydrosilylation reaction catalyst; and (F) from 0.1 to 10 parts by weight of an organosilicon compound containing an adhesion-promoting functional group.

[2]
The flame-resistant airbag of [1], wherein the addition-curable liquid silicone rubber composition further includes as component (G): from 0.1 to 5 parts by weight, per 100 parts by weight of component (A), of at least one type of co-condensation catalyst selected from organotitanium compounds and organozirconium compounds.

[3]
The flame-resistant airbag of [1] or [2], wherein component (C) is a surface-hydrophobized silica fine powder.

[4]
The flame-resistant airbag of any of [1] to [3], wherein component (F) is an organosilicon compound having on the molecule, as adhesion-promoting functional groups, an epoxy group and a silicon-bonded alkoxy group.

[5]
The flame-resistant airbag of any of [1] to [4] which has a combustion rate in the combustion test for airbags of Federal Motor Vehicle Safety Standard (FMVSS) No. 302 that is 40 mm/min or less.

[6]
A method of manufacturing flame-resistant airbags, which method includes the steps of:
preparing an addition-curable liquid silicone rubber composition that includes
  (A) 100 parts by weight of an organopolysiloxane which contains at least two silicon-bonded alkenyl groups of 2 to 8 carbon atoms per molecule and is liquid at 25° C.,
  (B) from 5 to 100 parts by weight of a three-dimensional network-type organopolysiloxane resin in which from 0.05 to 0.15 mol/100 g of alkenyl groups are bonded solely to difunctional $R^1R^2SiO_{2/2}$ units (D units; in the formula, $R^1$ is an alkenyl group of 2 to 8 carbon atoms and $R^2$ is a group selected from alkyl groups of 1 to 8 carbon atoms, alkenyl groups of 2 to 8 carbon atoms and aryl groups of 6 to 12 carbon atoms), in which the ratio (M units/T and/or Q units) of monofunctional $R^3_3SiO_{1/2}$ units (M units; in the formula, each $R^3$ is independently a group selected from alkyl groups of 1 to 8 carbon atoms and aryl groups of 6 to 12 carbon atoms) to branched siloxane units which are trifunctional $R^3SiO_{3/2}$ units (T units; in the formula, $R^3$ is the same as above) and/or tetrafunctional $SiO_{4/2}$ units (Q units) is from 0.65 to 1.40, and in which the amount of hydroxyl groups is 0.040 mol/100 g or less,
  (C) from 0.1 to 50 parts by weight of a silica fine powder having a specific surface area according to the BET method of at least 50 $m^2/g$,
  (D) an organohydrogenpolysiloxane containing at least two silicon-bonded hydrogen atoms per molecule, in an amount such that the number of silicon-bonded hydrogen atoms included on a molecule of component (D) per silicon-bonded alkenyl group in components (A) and (B) combined is from 1 to 10,
  (E) an effective amount of a platinum family metal catalyst as a hydrosilylation reaction catalyst, and
  (F) from 0.1 to 10 parts by weight of an organosilicon compound containing an adhesion-promoting functional group;
coating the composition onto at least one side of an airbag base fabric to a coating weight of from 5 to 150 $g/m^2$; and
heat-curing the base fabric coated with the composition.

[7]
The flame-resistant airbag manufacturing method of [6], wherein the addition-curable liquid silicone rubber composition further includes, as component (G): from 0.1 to 5 parts by weight, per 100 parts by weight of component (A), of at least one type of co-condensation catalyst selected from organotitanium compounds and organozirconium compounds.

[8]
The flame-resistant airbag manufacturing method of [6] or [7] which includes the step of using, as component (C) in the addition-curable liquid silicone rubber composition preparation step, a surface-hydrophobized silica fine powder that is already surface-treated or a surface-hydrophobized silica fine powder that is surface-treated in the preparation step.

[9]
The flame-resistant airbag manufacturing method of any of [6] to [8], wherein the addition-curable liquid silicone rubber composition has a viscosity at 25° C., as measured by the method described in JIS K 7117-1:1999, of from 1,000 to 1,000,000 mPa·s.

[10]
An addition-curable liquid silicone rubber composition for flame-resistant airbags, which composition includes:
  (A) 100 parts by weight of an organopolysiloxane which includes at least two silicon-bonded alkenyl groups of 2 to 8 carbon atoms per molecule and is liquid at 25° C.;
  (B) from 5 to 100 parts by weight of a three-dimensional network-type organopolysiloxane resin in which from 0.05 to 0.15 mol/100 g of alkenyl groups are bonded solely to difunctional $R^1R^2SiO_{2/2}$ units (D units; in the formula, $R^1$ is an alkenyl group of 2 to 8 carbon atoms and $R^2$ is a group selected from alkyl groups of 1 to 8 carbon atoms, alkenyl groups of 2 to 8 carbon atoms and aryl groups of 6 to 12 carbon atoms), in which the ratio (M units/T and/or Q units) of monofunctional $R^3_3SiO_{1/2}$ units (M units; in the formula, each $R^3$ is independently a group selected from alkyl groups of 1 to 8 carbon atoms and aryl groups of 6 to 12 carbon atoms) to branched siloxane units which are trifunctional $R^3SiO_{3/2}$ units (T units; in the formula, $R^3$ is the same as above) and/or tetrafunctional $SiO_{4/2}$ units (Q units) is from 0.65 to 1.40, and in which the amount of hydroxyl groups is 0.040 mol/100 g or less;
  (C) from 0.1 to 50 parts by weight of a silica fine powder having a specific surface area according to the BET method of at least 50 $m^2/g$;
  (D) an organohydrogenpolysiloxane containing at least two silicon-bonded hydrogen atoms per molecule, in an amount such that the number of silicon-bonded hydrogen atoms included on a molecule of component (D) per silicon-bonded alkenyl group in components (A) and (B) combined is from 1 to 10;
  (E) an effective amount of a platinum family metal catalyst as a hydrosilylation reaction catalyst; and
  (F) from 0.1 to 10 parts by weight of an organosilicon compound containing an adhesion-promoting functional group.

[11]
The addition-curable liquid silicone rubber composition for flame-resistant airbags of [10], further including as component (G): from 0.1 to 5 parts by weight, per 100 parts by weight of component (A), of at least one type of co-condensation catalyst selected from organotitanium compounds and organozirconium compounds.

[12]
The addition-curable liquid silicone rubber composition for flame-resistant airbags of [10] or [11], wherein the addition-curable liquid silicone rubber composition has a viscosity at 25° C., as measured by the method described in JIS K 7117-1:1999, of from 1,000 to 1,000,000 mPa·s.

Advantageous Effects of Invention

According to this invention, a flame-resistant airbag can be obtained in which the coated fabric has excellent low combustion rate properties as specified in FMVSS No. 308 and also has an excellent mechanical strength.

DESCRIPTION OF EMBODIMENTS

The invention is described more fully below. The viscosity is a value measured at 25° C. with a rotational viscometer by the method described in JIS K 7117-1:1999.
<Addition-Curable Liquid Silicone Rubber Composition>

The addition-curable liquid silicone rubber composition for flame-resistant airbags of the invention includes components (A) to (F) below, and is a liquid at room temperature (25° C.). The ingredients are each described in detail below.
[Component (A)]

Component (A) is an organopolysiloxane which has at least two silicon-bonded alkenyl groups per molecule and is liquid at 25° C. This serves as the base polymer of the inventive composition.

The molecular structure of component (A) is exemplified by linear, cyclic and branched structures, although the backbone is basically made up of repeating diorganosiloxane units. A linear diorganopolysiloxane in which both ends of the molecular chain are capped with triorganosiloxy groups is preferred. A three-dimensional network (resinous) structure is not included. Also, in cases where the molecular structure of the organopolysiloxane of component (A) is linear or branched, the positions of the silicon atoms to which alkenyl groups are bonded in the organopolysiloxane molecule may be either at the ends of the molecular chain (i.e., triorganosiloxy groups) or partway along the molecular chain (i.e., difunctional diorganosiloxy units or trifunctional monoorganosilsesquioxane units positioned at non-terminal sites on the molecular chain), or may be at both. It is especially preferable for component (A) to be a linear diorganopolysiloxane which contains silicon-bonded alkenyl groups at least at both ends of the molecular chain.

The silicon-bonded alkenyl groups in component (A) are exemplified by, typically, ones having from 2 to 8 carbon atoms, and preferably ones having from 2 to 4 carbon atoms. Specific examples include vinyl, allyl, propenyl, butenyl, pentenyl, hexenyl, cyclohexenyl and heptenyl groups. Vinyl groups are especially preferred.

The content of silicon-bonded alkenyl groups in component (A) is preferably from 0.001 to 10 mol %, and more preferably about 0.01 to about 5 mol %, of all the silicon-bonded monovalent organic groups (i.e., unsubstituted or substituted monovalent hydrocarbon groups).

Silicon-bonded monovalent organic groups other than alkenyl groups in component (A) are exemplified by mutually like or unlike monovalent hydrocarbon groups of 1 to 12 carbon atoms, preferably 1 to 10 carbon atoms. Specific examples of monovalent organic groups that may be used include alkyl groups such as methyl, ethyl, propyl, butyl, pentyl, hexyl, cyclohexyl and heptyl groups; aryl groups such as phenyl, tolyl, xylyl and naphthyl groups; aralkyl groups such as benzyl and phenethyl groups; and any of these groups in which some or all hydrogen atoms are substituted with halogen atoms such as fluorine, bromine or chlorine, examples of which include halogen-substituted alkyl groups such as chloromethyl, 3-chloropropyl and 3,3,3-trifluoropropyl groups. Of these methyl groups are especially preferred. Component (A) does not include epoxy groups.

Component (A) has a viscosity at 25° C. which is preferably in the range of 100 to 500,000 mPa·s, and more preferably in the range of 600 to 200,000 mPa·s. At a viscosity in this range, the ease of handling and working the resulting composition is good, and the resulting cured silicone rubber has good mechanical properties.

Specific examples of the organopolysiloxane of component (A) include dimethylsiloxane-methylvinylsiloxane copolymers capped at both ends of the molecular chain with trimethylsiloxy groups, methylvinylpolysiloxane capped at both ends of the molecular chain with trimethylsiloxy groups, dimethylsiloxane-methylvinylsiloxane-methylphenylsiloxane copolymers capped at both ends of the molecular chain with trimethylsiloxy groups, dimethylpolysiloxane capped at both ends of the molecular chain with dimethylvinylsiloxy groups, methylvinylpolysiloxane capped at both ends of the molecular chain with dimethylvinylsiloxy groups, dimethyl siloxane-methylvinylsiloxane copolymers capped at both ends of the molecular chain with dimethylvinylsiloxy groups, dimethylsiloxane-methylvinylsiloxane-methylphenylsiloxane copolymers capped at both ends of the molecular chain with dimethylvinylsiloxy groups, dimethylpolysiloxane capped at both ends of the molecular chain with divinylmethylsiloxy groups, dimethylsiloxane-methylvinylsiloxane copolymers capped at both ends of the molecular chain with divinylmethylsiloxy groups, dimethylpolysiloxane capped at both ends of the molecular chain with trivinylsiloxy groups, dimethyl siloxane-methylvinylsiloxane copolymers capped at both ends of the molecular chain with trivinylsiloxy groups, and mixtures of two or more of these organopolysiloxanes.

The organopolysiloxane of component (A) may be of one type used singly or two or more may be used together. The organopolysiloxane of component (A) excludes the subsequently described epoxy group-containing organosilicon compound [component (F)].
[Component (B)]

Component (B) is a three-dimensional network-type organopolysiloxane resin in which from 0.05 to 0.15 mol/100 g of alkenyl groups are bonded solely to difunctional $R^1R^2SiO_{2/2}$ units (D units; in the formula, $R^1$ is an alkenyl group of 2 to 8 carbon atoms and $R^2$ is a group selected from alkyl groups of 1 to 8 carbon atoms, alkenyl groups of 2 to 8 carbon atoms and aryl groups of 6 to 12 carbon atoms), in which the ratio (M units/T and/or Q units) of monofunctional $R^3_3SiO_{1/2}$ units (M units; in the formula, each $R^3$ is independently a group selected from alkyl groups of 1 to 8 carbon atoms and aryl groups of 6 to 12 carbon atoms) to branched siloxane units which are trifunctional $R^3SiO_{3/2}$ units (T units; in the formula, $R^3$ is the same as above) and/or tetrafunctional $SiO_{4/2}$ units (Q units) is from 0.65 to 1.40, and in which the amount of hydroxyl groups is 0.040 mol/100 g or less.

$R^1$ is an alkenyl group of 2 to 8 carbon atoms. Specific examples include vinyl, allyl, propenyl, butenyl, pentenyl, hexenyl, cyclohexenyl and heptenyl groups. A vinyl group is especially preferred.

$R^2$ is a group selected from alkyl groups of 1 to 8 carbon atoms, alkenyl groups of 2 to 8 carbon atoms and aryl groups of 6 to 12 carbon atoms. Specific examples include alkenyl groups such as vinyl, allyl, propenyl, butenyl, pentenyl, hexenyl, cyclohexenyl and heptenyl groups; alkyl groups such as methyl, ethyl, propyl, butyl, pentyl, hexyl, cyclohexyl and heptyl groups; aryl groups such as phenyl, tolyl, xylyl and naphthyl groups; aralkyl groups such as benzyl and phenethyl groups; and halogen-substituted alkyl groups such as chloromethyl, 3-chloropropyl and 3,3,3-trifluoropropyl groups. Methyl and vinyl groups are especially preferred.

Each $R^3$ is independently a group selected from alkyl groups of 1 to 8 carbon atoms and aryl groups of 6 to 12 carbon atoms. Specific examples include alkyl groups such as methyl, ethyl, propyl, butyl, pentyl, hexyl, cyclohexyl and heptyl groups; aryl groups such as phenyl, tolyl, xylyl and naphthyl groups; aralkyl groups such as benzyl and phenethyl groups; and halogen-substituted alkyl groups such as chloromethyl, 3-chloropropyl and 3,3,3-trifluoropropyl groups. Methyl groups are especially preferred.

Method of Measuring the (M Units/T and/or Q Units) Ratio

The (M units/T and/or Q units) ratio of monofunctional $R^3{}_3SiO_{1/2}$ units (M units) to at least one type of branched siloxane unit selected from trifunctional $R^3SiO_{3/2}$ units (T units) and tetrafunctional $SiO_{4/2}$ units (Q units) in the organopolysiloxane resin having a three-dimensional network-type (resinous) structure can be determined by, for example, $^{29}$Si-NMR.

The method of preparing the $^{29}$Si-NMR sample is not particularly limited. For example, measurement may be carried out by dissolving 1 part by weight of the organopolysiloxane resin in 3 parts by weight of heavy chloroform.

Here, the (M units/T and/or Q units) ratio is from 0.65 to 1.40, and preferably from 0.7 to 1.0. At a (M units/T and/or Q units) ratio smaller than 0.65, the viscosity of the liquid silicone rubber composition rises and the coating operation becomes difficult to carry out. At a ratio larger than 1.40, a sufficient flame resistance-enhancing effect may not be obtained.

Method of Measuring Amount of Alkenyl Groups

The amount of silicon-bonded alkenyl groups on the organopolysiloxane resin having a three-dimensional network-like (resinous) structure can be determined, for example, as follows.

A solution of 50 parts by weight of an organopolysiloxane resin having a three-dimensional network-like (resinous) structure dissolved in 50 parts by weight of xylene is weighed out into a vessel such as an Erlenmeyer flask, and 30 mL of carbon tetrachloride is added. Next, 25 mL of Hanus solution (a mixture of 1 part by weight of iodine bromide and 60 parts by weight of acetic acid) is added and stirring is carried out for 60 minutes. This is followed by the addition of 20 mL of a 10% aqueous solution of potassium iodide and 5 minutes or more of stirring. Next, titration is carried out with a 0.1 mol/L aqueous solution of sodium thiosulfate until the mixture changes from a brown color to a colorless state. Other than not adding the organopolysiloxane resin, a blank is titrated in the same way, enabling the amount of alkenyl groups to be determined from the following formula.

$$\text{Amount of alkenyl groups(mol/100 g)=(blank titer (mL)–sample titer(mL))×0.01/amount of sample (g)} \quad \text{[Math. 1]}$$

The silicon-bonded alkenyl groups in component (B) are included only in the D units; the amount of these alkenyl groups is from 0.05 to 0.15 mol/100 g, and preferably from 0.08 to 0.12 mol/100 g. When the amount of alkenyl groups falls outside of this range, the mechanical properties of the cured form of the liquid silicone rubber composition may worsen.

Method of Measuring Amount of Hydroxyl Groups

The amount of hydroxyl groups in the organopolysiloxane resin having a three-dimensional network-like (resinous) structure can be determined, for example, as follows.

A solution of 50 parts by weight of an organopolysiloxane resin having a three-dimensional network-like (resinous) structure dissolved in 50 parts by weight of xylene is prepared, about 4.0 g of this is weighed out and placed in the test tube on one side of a forked test tube, and about 8 mL of approximately 0.5M methyl magnesium iodide (as a di-n-butyl ether solution) is measured out into the test tube on the other side. The openings in the forked test tube are closed with the rubber stoppers that come with the tube, following which the sample and the methyl magnesium iodide solution are mixed together and the amount of methane gas (mL) that evolves is measured, enabling the amount of hydroxyl groups to be determined from the following formula.

$$\text{Amount of hydroxyl groups(mol/100 g)=amount of methane gas evolved(mL)/22,400+amount of sample(g)×0.5/100×273/(273+room temperature of measurement chamber(° C.))×pressure of measurement chamber(hPa)/1013} \quad \text{[Math. 2]}$$

The method of measuring the amount of methane gas that evolves is not particularly limited. For example, measurement may be carried out by, for example, the water displacement method using a burette or the like. The water displacement method was used in this invention The amount of silicon-bonded hydroxyl groups in component (B) is 0.04 mol/100 g or less, and preferably 0.030 mol/100 g or less. When the content of silicon-bonded hydroxyl groups in component (B) is larger than 0.040 mol/100 g, the amount of low-molecular-weight siloxane that forms during combustion of the coated fabric may increase, worsening the flame resistance.

The weight-average molecular weight of the organopolysiloxane resin having a three-dimensional network-like (resinous) structure of component (B) is preferably from 2,000 to 12,000, and more preferably from 4,000 to 8,000. The weight-average molecular weight can be determined as, for example, the polystyrene-equivalent weight-average molecular weight by gel permeation chromatography (GPC) under the below-indicated conditions using tetrahydrofuran (THF) as the developing solvent.

[Measurement Conditions]
Developing solvent: Tetrahydrofuran (THF)
Flow rate: 0.6 mL/min
Detector: Differential refractive index detector (RI)
Columns: TSK Guardcolumn Super H-L TSKgel SuperH4000 (6.0 mm I.D.×15 cm×1) TSKgel SuperH3000 (6.0 mm I.D.×15 cm×1) TSKgel SuperH2000 (6.0 mm I.D.×15 cm×2) (all products of Tosoh Corporation)
Column temperature: 40° C.
Sample preparation conditions: 1 part by weight of a 50% xylene solution of the organopolysiloxane resin was dissolved in 1,000 parts by weight of THF, and filtered with a membrane filter
Amount of sample injection: 10 μL The content of component (B) per 100 parts by weight of the organopolysiloxane of component (A) is from 5 to 100 parts by weight, and preferably from 10 to 50 parts by weight. When the content is too low, a sufficient flame resistance-enhancing effect may not be obtained; when the content is too high, the viscosity of the composition becomes high, as a result of which the ease of the coating operation may worsen.

The three-dimensional network-like organopolysiloxane resin of component (B), so long as it satisfies the above conditions, may be of one type used alone or two or more types may be used together.

[Component (C)]

The silica fine powder of component (C) acts as a reinforcing filler. That is, it imparts strength to the cured silicone rubber obtained from the composition of the invention. By using a silica fine powder as a reinforcing filler, it is possible to form a coating film that satisfies the strength required in this invention. The silica fine powder has a specific surface area (BET method) of at least 50 m²/g, preferably from 50 to 400 m²/g, and more preferably from 100 to 300 m²/g. At a specific surface area below 50 m²/g, satisfactory strength properties cannot be imparted.

Such a silica fine powder may be a known silica fine powder that has hitherto been used as a reinforcing filler for silicone rubbers, provided that the specific surface area falls within the above range. Examples include fumed silica and precipitated silica (wet silica). These may be of one type used alone or two or more types may be used together.

A silica fine powder whose surface has been hydrophobized with a (generally hydrolyzable) surface treatment agent such as chlorosilane, alkoxysilane or organosilazane may be used as the reinforcing silica fine powder. In this case, the silica fine powder that is used may be one which has been subjected beforehand, in the state of a powder, to direct surface hydrophobization with a surface treatment agent, or may be one obtained by adding a surface treatment agent to a mixture of the silica fine powder with a silicone oil (e.g., the alkenyl group-containing organopolysiloxane of component (A)) and carrying out surface hydrophobization.

Surface treatment by a known technique may be used as the normal treatment method for component (C). For example, the above untreated silica fine powder and a treatment agent may be placed in a mechanical mixer or fluidized bed that has been sealed at normal pressure, and mixing treatment carried out at room temperature (25° C.) or under heat treatment (heating) and, if necessary, in the presence of an inert gas. In some cases, treatment may be accelerated by water or a catalyst (e.g., a hydrolysis promoter). After mixing, drying may be carried out, thereby producing a treated silica fine powder. The content of the treatment agent should be at least the amount calculated from the treatment agent coverage.

Specific examples of the surface treatment agent include silazanes such as hexamethyldisilazane, silane coupling agents such as methyltrimethoxysilane, ethyltrimethoxysilane, propyltrimethoxysilane, butyltrimethoxysilane, dimethyldimethoxysilane, diethyldimethoxysilane, vinyltriethoxysilane, vinyltrimethoxysilane, trimethylmethoxysilane, triethylmethoxysilane, vinyltris(methoxyethoxy)silane, trimethylchlorosilane, dimethyldichlorosilane, divinyldimethoxysilane and chloropropyltrimethoxysilane, polymethylsiloxanes and organohydrogenpolysiloxanes. The silica fine powder may be used as a hydrophobic silica fine powder obtained by surface treatment thereof. Silane coupling agents and silazanes are especially preferred as the surface treatment agent.

The content of component (C) per 100 parts by weight of the organopolysiloxane serving as component (A) is from 0.1 to 50 parts by weight, and preferably from 10 to 30 parts by weight. When the content is too low, the required strength is not obtained; when the content is too high, the thixotropic properties of the composition become large, the flowability decreases, and the ease of the coating operation worsens.

[Component (D)]

The organohydrogenpolysiloxane used as component (D) is a compound that undergoes hydrosilylation addition reactions with alkenyl groups in components (A) and (B) and serves as a crosslinking agent (curing agent). The molecular structure is not particularly limited. Various hitherto produced types having, for example, linear, cyclic, branched or three-dimensional network (resinous) structures may be used, although the organohydrogenpolysiloxane must have at least two silicon-bonded hydrogen atoms (hydrosilyl groups represented as SiH) per molecule. Moreover, the organohydrogenpolysiloxane is one having substantially no silicon-bonded hydroxyl groups (silanol groups) on the molecule.

The organohydrogenpolysiloxane of component (D) may be of one type used alone or two or more may be used together. The organohydrogenpolysiloxane of component (D) excludes the subsequently described epoxy group-bearing organosilicon compound (component (F)).

A compound having the following average compositional formula (1) may be used as this organohydrogenpolysiloxane.

$$R^4{}_a H_b SiO_{(4-a-b)/2} \quad (1)$$

In formula (1), each $R^4$ is a mutually like or unlike silicon-bonded monovalent hydrocarbon group of preferably 1 to 10 carbon atoms, excluding aliphatic unsaturated bonds such as alkenyl groups. Examples of the monovalent hydrocarbon groups in $R^4$ include alkyl groups such as methyl, ethyl, propyl, isopropyl, butyl, isobutyl, tert-butyl, pentyl, neopentyl, hexyl, cyclohexyl, octyl, nonyl and decyl groups; aryl groups such as phenyl, tolyl, xylyl and naphthyl groups; and aralkyl groups such as benzyl, phenylethyl and phenylpropyl groups. Any of these groups in which some or all hydrogen atoms are substituted with halogen atoms such as fluorine, bromine or chlorine, examples of which include chloromethyl, chloropropyl, bromoethyl and trifluoropropyl groups, may also be used. The monovalent hydrocarbon group of $R^4$ is preferably an alkyl or aryl group, and is more preferably a methyl group. Also, the subscript 'a' is a positive number from 0.7 to 2.1, b is a positive number from 0.001 to 1.0, and the sum a+b is a positive number from 0.8 to 3.0. Preferably, 'a' is a positive number from 1.0 to 2.0, b is a positive number from 0.01 to 1.0, and the sum a+b is a positive number from 1.5 to 2.5.

The at least two SiH groups included per molecule may be positioned at either the ends of the molecular chain or partway along the molecular chain, or may be positioned at both. Also, the molecular structure of this organohydrogenpolysiloxane may be linear, cyclic, branched or a three-dimensional network structure, although it is advantageous for the number of silicon atoms per molecule (or degree of polymerization) to be generally from 2 to 300, preferably from 3 to 150, and more preferably from about 4 to about 100. One that is liquid at 25° C. and has a viscosity at 25° C. of generally from 0.1 to 1,000 mPa·s, and preferably from about 0.5 to about 500 mPa·s, is used. The degree of polymerization can be determined as, for example, the polystyrene-equivalent number-average degree of polymerization (number-average molecular weight) or weight-average degree of polymerization (weight-average molecular weight) in gel permeation chromatography (GPC) using toluene as the developing solvent.

Examples of such organohydrogenpolysiloxanes for component (D) include 1,1,3,3-tetramethyldisiloxane, 1,3,5,7-tetramethylcyclotetrasiloxane, tris(hydrogendimethylsiloxy)methylsilane, tris(hydrogendimethylsiloxy)phenylsilane, methylhydrogencyclopolysiloxane, methylhydrogensiloxane-dimethylsiloxane cyclic copolymers, methylhydrogenpolysiloxane capped at both ends of the molecular chain with trimethylsiloxy groups, dimethylsiloxane-methylhydrogensiloxane copolymers capped at both ends of the molecular chain with trimethylsiloxy groups, dimethylsiloxane-methylhydrogensiloxane-methylphenylsiloxane copolymers capped at both ends of the molecular chain with trimethylsiloxy groups, dimethylsiloxane-methylhydrogensiloxane-diphenylsiloxane copolymers capped at both ends of the molecular chain with trimethylsiloxy groups, methylhydrogenpolysiloxane capped at both ends of the molecular chain with dimethylhydrogensiloxy groups, dimethylpolysiloxane capped at both ends of the molecular chain with dimethylhydrogensiloxy groups, dimethyl siloxane-methylhydrogensiloxane copolymers capped at both ends of the molecular chain with dimethylhydrogensiloxy groups, dimethylsiloxane-methylphenylsiloxane copolymers capped at both ends of the molecular chain with dimethylhydrogensiloxy groups, dimethyl siloxane-diphenylsiloxane copolymers capped at both ends of the molecular chain with dimethylhydrogensiloxy groups, methylphenylpolysiloxane capped at both ends of the molecular chain with dimethylhydrogensiloxy groups, diphenylpolysiloxane capped at both ends of the molecular chain with dimethylhydrogensiloxy groups and, in the foregoing example compounds, those in which some or all methyl groups are substituted with other alkyl groups such as ethyl or propyl groups; as well as organosiloxane copolymers consisting of siloxane units of the formula $R^5_3SiO_{1/2}$, siloxane units of the formula $R^5_2HSiO_{1/2}$ and siloxane units of the formula $SiO_{4/2}$, organosiloxane copolymers consisting of siloxane units of the formula $R^5_2HSiO_{1/2}$ and siloxane units of the formula $SiO_{4/2}$, organosiloxane copolymers consisting of siloxane units of the formula $R^5HSiO_{2/2}$ and siloxane units of the formula $R^5SiO_{3/2}$ or siloxane units of the formula $HSiO_{3/2}$, and mixtures of two or more of these organopolysiloxanes. $R^5$ is a group selected from alkyl groups of 1 to 8 carbon atoms or aryl groups of 6 to 12 carbon atoms, and is more preferably a methyl group.

The content of component (D) is an amount such that the number (or moles) of silicon-bonded hydrogen atoms in component (D) per silicon-bonded alkenyl group (or mole thereof) in components (A) and (B) combined is in the range of 1 to 10, and preferably 1 to 5. When there is less than one silicon-bonded hydrogen atom in component (D) per silicon-bonded alkenyl group in components (A) and (B), the composition may not fully cure; when there are more than 10, the heat resistance of the resulting cured silicone rubber may radically worsen.

[Component (E)]

Component (E) is exemplified by platinum family metal catalysts such as platinum black, platinic chloride, chloroplatinic acid, reaction products of chloroplatinic acid with monohydric alcohols, complexes of chloroplatinic acid and olefins, and complexes of chloroplatinic acid and vinyl group-containing (poly)siloxanes.

The content of component (E) can be set to a catalytic amount, which amount is generally, in terms of the platinum family metal (weight basis), from 0.5 to 1,000 ppm, and especially from about 1 to about 500 ppm, with respect to the total weight of the silicone rubber composition. When the amount of addition is too low, a decrease in curability arises; when the amount of addition is too high, the cost rises, becoming uneconomical.

[Component (F)]

Component (F) is an organosilicon compound containing an adhesion-promoting functional group. An organosilicon compound having on one molecule an epoxy group and a silicon-bonded alkoxy group as the adhesion-promoting functional groups is preferred. Component (F) is added in order to manifest and increase adhesion of the silicone rubber composition to an airbag base fabric.

The organosilicon compound used for this purpose may be any organosilicon compound having such adhesion-promoting functional groups, although organosilicon compounds having one or more each of an epoxy group and a silicon-bonded alkoxy group per molecule are preferred. From the standpoint of the adhesion-manifesting ability, an organosilicon compound containing at least one epoxy group and at least two silicon-bonded alkoxy groups (e.g., trialkoxysilyl groups, organodialkoxysilyl groups), such as a cyclic or linear organosiloxane having from 2 to 100, preferably from about 4 to 50, silicon atoms and containing at least one epoxy group and at least two silicon-bonded alkoxy groups, is more preferred. Component (F) may be of one type used alone or two or more types may be used together.

The epoxy group is preferably bonded to a silicon atom in the form of, for example, a glycidoxyalkyl group such as the glycidoxypropyl group or an epoxy-containing cyclohexylalkyl group such as the 2,3-epoxycyclohexylethyl and 3,4-epoxycyclohexylethyl groups. The silicon-bonded alkoxy groups preferably bond with silicon atoms to form, for example, trialkoxysilyl groups such as trimethoxysilyl and triethoxysilyl groups, or alkyldialkoxysilyl groups such as methyldimethoxysilyl, ethyldimethoxysilyl, methyldiethoxysilyl and ethyldiethoxysilyl groups.

Component (F) may also have, as functional groups other than the epoxy group and the silicon-bonded alkoxy groups on the molecule, at least one type of functional group selected from the group consisting of alkenyl groups such as the vinyl group, the acrylic group, (meth)acryloxy groups and the hydrosilyl group (SiH group).

Examples of the organosilicon compound of component (F) include epoxy functional group-containing silane coupling agents (i.e., epoxy functional group-containing organoalkoxysilanes) such as γ-glycidoxypropyltriethoxysilane, γ-glycidoxypropylmethyldiethoxysilane, (3,4-epoxycyclohexylethyl)trimethoxysilane, (3,4-epoxycyclohexylethyl)triethoxysilane, (3,4-epoxycyclohexylethyl)methyldimethoxysilane, (3,4-epoxycyclohexylethyl)methyldiethoxysilane, (2,3-epoxycyclohexylethyl)triethoxysilane, (2,3-epoxycyclohexylethyl)methyldimethoxysilane and (2,3-epoxycyclohexylethyl)methyldiethoxysilane, as well as organosilicon compounds such as organosilanes and organopolysiloxanes of the chemical formulas shown below, mixtures of two or more of these, or partial hydrolytic condensation products of one, two or more of these.

[Chem. 1]

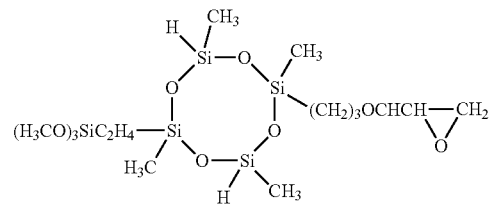

-continued

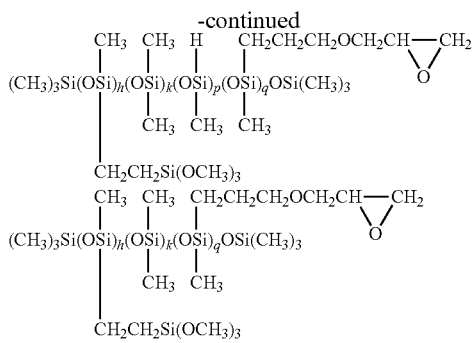

In these formulas, h is an integer from 1 to 10; k is an integer from 0 to 40, preferably from 0 to 20; p is an integer from 1 to 40, preferably from 1 to 20; and q is an integer from 1 to 10.

The content of component (F) per 100 parts by weight of the organopolysiloxane of component (A) is from 0.1 to 10 parts by weight, preferably from 0.25 to 5 parts by weight. At a content below 0.1 part by weight, the resulting composition lacks a sufficient adhesive strength. At a content greater than 10 parts by weight, further increasing the content does not readily enhance the adhesive strength of the resulting composition and is costly and thus uneconomical.

When component (F) contains an alkenyl group and/or a SiH group, it is included in an amount such that the number (or moles) of silicon-bonded hydrogen atoms on components (D) and (F) per silicon-bonded alkenyl group (or mole thereof) on components (A), (B) and (F) is in the range of 1 to 10, preferably 1 to 8, and more preferably 1 to 6. When the number of silicon-bonded hydrogen atoms in the composition per silicon-bonded alkenyl group in the composition is less than one, the composition may not fully cure and may not have a sufficient adhesive strength. On the other hand, when it exceeds 10, the resulting cured silicone rubber has a very poor heat resistance and the adhesive strength does not readily improve, in addition to which the cost becomes high, which tends to make the silicone rubber uneconomical.

[Component (G)]

Component G is at least one compound selected from organotitanium compounds and organozirconium compounds, and acts as a co-condensation catalyst for promoting adhesion.

Component (G) may be of one type used alone or two or more types may be used together.

Specific examples of component (G) include titanium-based co-condensation catalysts (titanium compounds), including organic titanates such as titanium tetraisopropoxide, titanium tetra-n-butoxide and titanium tetra-2-ethylhexoxide, and organotitanium chelate compounds such as titanium diisopropoxy bis(acetylacetonate), titanium diisopropoxy bis(ethyl acetoacetate) and titanium tetraacetyl acetonate; and zirconium-based co-condensation catalysts (zirconium compounds), including organic zirconates such as zirconium tetra-n-propoxide and zirconium tetra-n-butoxide, and organozirconium chelate compounds such as zirconium tributoxy monoacetyl acetonate, zirconium monobutoxy acetyl acetonate bis(ethyl acetoacetate) and zirconium tetraacetyl acetonate.

The organotitanium compounds and organozirconium compounds of component (G) are optional ingredients that are included where necessary. The content thereof per 100 parts by weight of component (A) may generally be about 5 parts by weight or less (0 to 5 parts by weight). When component (G) is included, the amount is in the range of preferably 0.1 to 5 parts by weight, and more preferably 0.2 to 2 parts by weight.

At a content below 0.1 part by weight, the bonding durability of the resulting cured product at high temperature and humidity may have a tendency to decrease. At a content above 5 parts by weight, the heat resistance of the resulting cured product may have a tendency to decrease.

Fillers

Examples of fillers other than the silica fine powder of component (C) include fillers such as crystalline silica (e.g., quartz powder having a BET specific surface area of less than 50 m$^2$/g), silicate mineral fine powders, hollow fillers made of organic resins, polymethyl silsesquioxane fine particles (so-called silicone resin powders), fumed titanium dioxide, magnesium oxide, zinc oxide, iron oxide, aluminum hydroxide, magnesium carbonate, calcium carbonate, zinc carbonate, lamellar mica, carbon black, diatomaceous earth and glass fibers; fillers obtained by the surface hydrophobizing treatment of these fillers with organosilicon compounds such as organoalkoxysilane compounds, organochlorosilane compounds, organosilazane compounds and low-molecular-weight siloxane compounds; and silicone rubber powders.

Other Ingredients

In addition, other ingredients such as organopolysiloxanes which contain one silicon-bonded hydrogen atom per molecule and contain no other functional groups, organopolysiloxanes which contain one silicon-bonded alkenyl group per molecule and contain no other functional groups, nonfunctional organopolysiloxanes which contain no silicon-bonded hydrogen atoms, silicon-bonded alkenyl groups or other functional groups (so-called dimethylsilicone oils), organic solvents, anti-creep hardening agents, plasticizers, thixotropy agents, pigments, dyes and mildewproofing agents may be included. Each of these other ingredients may be of one type used alone or of two or more types used together.

<Preparation of Addition-Curable Liquid Silicone Rubber Composition>

An addition-curable liquid silicone rubber composition can be prepared by uniformly mixing together the resulting components (A) to (F), preferably components (A) to (G), and other optional ingredients that are added where necessary.

This addition-curable liquid silicone rubber composition is a composition which is liquid at 25° C. and has a viscosity at 25° C., as measured by the method described in JIS K 7117-1:1999, which is preferably from 1,000 to 1,000,000 mPa·s, and more preferably from 10,000 to 300,000 mPa·s. Within this viscosity range, suitable use is possible because, when the composition is coated onto an airbag base fabric, problems such as uneven coating and poor adhesion after curing do not readily arise.

<Airbag Manufacturing Method>

The airbag manufacturing method includes the steps of preparing the above-described addition-curable liquid silicone rubber composition, coating the composition onto at least one side of an airbag base fabric to a coating weight of from 5 to 150 g/m$^2$, and heat-curing the base fabric that has been coated with the composition.

Either of the following may be included in the addition-curable liquid silicone rubber composition preparation step: the step of using a surface-hydrophobized silica fine powder that is already surface-treated, or the step of using a surface-hydrophobized silica fine powder that is surface treated in the preparation step. In the latter case in particular, surface hydrophobizing treatment can be carried out by adding the above-described surface treatment agent at the time of mixture with silicone oil (e.g., the alkenyl group-containing organopolysiloxane of component (A)). The surface treatment method and surface treatment agent are as described above.

In general, a known fabric may be used as the airbag base fabric (a base fabric consisting of a textile fabric) on which the silicone rubber layer is formed. Specific examples include woven fabrics composed of various types of synthetic fibers, including various polyamide fibers such as nylon 66, nylon 6 and aramid fibers, and various polyester fibers such as polyethylene terephthalate (PET) and polybutylene terephthalate (PBT).

Such an airbag base fabric (base fabric consisting of a textile fabric) is coated on at least one side with the above-described addition-curable liquid silicone rubber composition, and then heat-cured in a drying oven or the like, thereby enabling a silicone rubber layer (layer of cured composition) to be formed on the base fabric. Airbags can be manufactured using the silicone rubber-coated base fabric for airbags thus obtained.

Here, a conventional method may be used as the method for coating the liquid silicone rubber composition onto the airbag base fabric. Coating with a knife coater is preferred.

The coating weight (or surface coating weight) is preferably from 5 to 150 g/m$^2$, more preferably from 10 to 80 g/m$^2$, and even more preferably from 15 to 60 g/m$^2$. At a coating weight below 5 g/m$^2$, sufficient airtightness and flame resistance cannot be imparted to the airbag. At a coating weight greater than 150 g/m$^2$, the volume of the airbag when folded becomes large, which may be inconvenient when the airbag is to be stowed in a vehicle.

The liquid silicone rubber composition can be cured by a known curing method under known curing conditions. Specifically, the composition can be cured by, for example atmospheric-pressure heating and drying in a drying oven at 100 to 200° C. for 0.5 to 60 minutes.

When fabricating the silicone rubber-coated base fabric for airbags (airbag fabric) into airbags, the manufacturing method entails, for example, bonding together the outer peripheries of two plain-weave fabrics that have been coated on at least the inner faces thereof with silicone rubber, and sewing the adhesive layers together. Alternatively, a method may be used in which, as described above, the liquid silicone rubber composition is coated to a specific coating weight onto at least the inner side of an already circular woven and manufactured airbag base fabric, and is then cured under specific curing conditions. The adhesive used here may be a known adhesive, although the use of silicone-based adhesives referred to as seam sealants is preferred from the standpoint of adhesive strength, bonding durability and the like.

EXAMPLES

The invention is illustrated more fully below by way of Examples and Comparative Examples, although the invention is not limited by these Examples. In the following Examples, the viscosity values were measured at 25° C. with the rotational viscometer mentioned in JIS K 7117-1:1999. The (M units/T and/or Q units) ratio of monofunctional $R^3_3SiO_{1/2}$ units (M units) to at least one type of branched siloxane unit selected from trifunctional $R^3SiO_{3/2}$ units (T units) and tetrafunctional $SiO_{4/2}$ units (Q units) in component (B) was determined by placing a sample prepared by dissolving 1 part by weight of the organopolysiloxane resin in 3 parts by weight of heavy chloroform within a Teflon™ NMR sample tube and measuring the $^{29}$Si-NMR spectrum by carrying out 3,000 runs on the ECX-500II (JEOL Ltd.). The amount of alkenyl groups and the amount of hydroxyl groups in component (B) were respectively measured by the above-described methods.

Preparation Example 1

A kneader was charged with 65 parts by weight of a dimethylpolysiloxane (A1) capped at both ends of the molecular chain with vinyldimethylsiloxy groups and having a viscosity at 25° C. of 30,000 mPa·s, 8 parts by weight of hexamethyldisilazane, 2 parts by weight of water and 40 parts by weight of silica fine powder (C1) having a specific surface area (BET method) of 300 m$^2$/g (Aerosil 300, from Nippon Aerosil Co., Ltd.), and the ingredients were mixed together at room temperature for one hour. Next, the temperature was raised to 150° C. and mixing was continued for 2 hours. The temperature was then lowered to room temperature and the following were added thereto and mixed to uniformity so as to give Base Compound (1): 19 parts by weight of dimethylpolysiloxane (A1) capped at both ends of the molecular chain with vinyldimethylsiloxy groups and having a viscosity at 25° C. of 30,000 mPa·s, and 5 parts by weight of a dimethyl-vinylmethyl polysiloxane (A2) which includes, of the difunctional diorganosiloxane units making up the backbone, 5 mol % of vinylmethylsiloxane units and 95 mol % of dimethylsiloxane units, is capped at both ends of the molecular chain with trimethylsiloxy groups and has a viscosity at 25° C. of 700 mPa·s.

Example 1

Composition A (molar ratio of SiH groups in component (C) to silicon-bonded vinyl groups in components (A) and (B): SiH/SiVi=4.5) was prepared by mixing the following ingredients for 1 hour at room temperature into 105 parts by weight of Base Compound (1) obtained above: 32.5 parts by weight of dimethylpolysiloxane (A3) capped at both ends of the molecular chain with vinyldimethylsiloxy groups and having a viscosity at 25° C. of 5,000 mPa·s, 56 parts by weight of dimethylpolysiloxane (A4) capped at both ends of the molecular chain with vinyldimethylsiloxy groups and having a viscosity at 25° C. of 1,000 mPa·s, 32.5 parts by weight of an organopolysiloxane resin (B1) having a three-dimensional network structure consisting of $(CH_3)_3SiO_{1/2}$ units, $(CH_3)(CH_2=CH)SiO_{2/2}$ units and $SiO_{4/2}$ units, having an M unit/Q units ratio of 0.80 and having an alkenyl group content of 0.10 mol/100 g and a hydroxyl group content of 0.010 mol/100 g, 17 parts by weight of dimethyl siloxane-methylhydrogensiloxane copolymer (D) (silicon-bonded hydrogen atom content=0.0108 mol/g) which has pendant silicon-bonded hydrogen atoms, is capped at both ends of the molecular chain with trimethylsiloxy groups and has a viscosity at 25° C. of 45 mPa·s, 0.09 part by weight of 1-ethynylcyclohexanol, 0.45 part by weight of a dimethylpolysiloxane solution (E) containing a chloroplatinic acid/1,3-divinyltetramethyldisiloxane complex in a platinum atom content of 1 wt %, 0.56 part by weight of γ-glycidoxypropyltrimethoxysilane (F), and 0.3 part by weight of zirconium tetraacetyl acetonate (G).

Next, the resulting Composition A was press-cured at 150° C. for 5 minutes, thereby producing a sheet in accordance with JIS K 6249:2003, and the results obtained by measuring the hardness, elongation at break, tensile strength and tear strength (crescent) of the sheet in accordance with JIS K 6249:2003 are shown in Table 1. Using the coated base fabric obtained by coating Composition A to a coating weight of 25 to 30 g/m$^2$ onto a nylon 66 base fabric (210 denier) for airbags and then curing at 200° C. for 1 minute in a dryer, the combustion rate was measured by the method specified in FMVSS No. 302. Table 1 shows the average combustion rate obtained as a result of carrying out the combustion test ten times.

Preparation Example 2

A kneader was charged with 65 parts by weight of a dimethylpolysiloxane (A1) capped at both ends of the molecular chain with vinyldimethylsiloxy groups and having a viscosity at 25° C. of 30,000 mPa·s and 40 parts by weight of a silica fine powder (C2) (Musil-130A, from Shin-Etsu Chemical Co., Ltd.) obtained by treating a silica fine powder having a specific surface area (BET method) of 300 m$^2$/g with trimethylsilazane, and the ingredients were mixed together at room temperature for one hour. Next, the temperature was raised to 150° C. and mixing was continued for 2 hours. The temperature was then lowered to room temperature and the following ingredients were added thereto and mixed to uniformity so as to give Base Compound (2): 19 parts by weight of dimethylpolysiloxane (A1) capped at both ends of the molecular chain with vinyldimethylsiloxy groups and having a viscosity at 25° C. of 30,000 mPa·s and 5 parts by weight of a dimethyl-vinylmethyl polysiloxane (A2) which includes, of the difunctional diorganosiloxane units making up the backbone, 5 mol % of vinylmethylsiloxane units and 95 mol % of dimethylsiloxane units, is capped at both ends of the molecular chain with trimethylsiloxy groups and has a viscosity at 25° C. of 700 mPa·s.

Example 2

Aside from substituting Base Compound (1) in Example 1 with the same number of parts of Base Compound (2), Composition B was prepared in exactly the same way. Table 1 shows the results obtained when the same evaluations as in Example 1 were carried out.

Example 3

Aside from substituting the organopolysiloxane resin (B1) having a three-dimensional network structure in Example 1 with the same number of parts of an organopolysiloxane resin (B2) having a three-dimensional network structure consisting of $(CH_3)_3SiO_{1/2}$ units, $(CH_3)(CH_2=CH)SiO_{2/2}$ units and $SiO_{3/2}$ units, having an M unit/T unit ratio of 0.80 and having an alkenyl group content of 0.10 mol/100 g and a hydroxyl group content of 0.010 mol/100 g, Composition C was prepared in exactly the same way. Table 1 shows the results obtained when the same evaluations as in Example 1 were carried out.

Comparative Example 1

Aside from substituting the organopolysiloxane resin (B1) having a three-dimensional network structure in Example 1 with the same number of parts of an organopolysiloxane resin (B3) having a three-dimensional network structure consisting of $(CH_3)_3SiO_{1/2}$ units, $(CH_3)_2(CH_2=CH)SiO_{1/2}$ units and $SiO_{4/2}$ units and having an M unit/Q unit ratio of 0.80, an alkenyl group content of 0.10 mol/100 g and a hydroxyl group content of 0.010 mol/100 g, Composition D was prepared in exactly the same way. Table 1 shows the results obtained when the same evaluations as in Example 1 were carried out.

Comparative Example 2

Aside from substituting the organopolysiloxane resin (B1) having a three-dimensional network structure in Example 1 with the same number of parts of an organopolysiloxane resin (B4) having a three-dimensional network structure consisting of $(CH_3)_3SiO_{1/2}$ units, $(CH_3)(CH_2=CH)SiO_{2/2}$ units and $SiO_{4/2}$ units and having an M unit/Q unit ratio of 0.80, an alkenyl group content of 0.10 mol/100 g and a hydroxyl group content of 0.045 mol/100 g, Composition E was prepared in exactly the same way. Table 1 shows the results obtained when the same evaluations as in Example 1 were carried out.

Comparative Example 3

Aside from substituting the organopolysiloxane resin (B1) having a three-dimensional network structure in Example 1 with the same number of parts of an organopolysiloxane resin (B5) having a three-dimensional network structure consisting of $(CH_3)_3SiO_{1/2}$ units, $(CH_3)(CH_2=CH)SiO_{2/2}$ units and $SiO_{4/2}$ units and having an M unit/Q unit ratio of 1.80, an alkenyl group content of 0.10 mol/100 g and a hydroxyl group content of 0.010 mol/100 g, Composition F was prepared in exactly the same way. Table 1 shows the results obtained when the same evaluations as in Example 1 were carried out.

Comparative Example 4

Aside from substituting the organopolysiloxane resin (B1) having a three-dimensional network structure in Example 1 with the same number of parts of an organopolysiloxane resin (B6) having a three-dimensional network structure consisting of $(CH_3)_3SiO_{1/2}$ units, $(CH_3)(CH_2=CH)SiO_{2/2}$ units and $SiO_{4/2}$ units and having an M unit/Q unit ratio of 0.40, an alkenyl group content of 0.10 mol/100 g and a hydroxyl group content of 0.010 mol/100 g, Composition G was prepared in exactly the same way. Table 1 shows the results obtained when the same evaluations as in Example 1 were carried out.

Comparative Example 5

Aside from substituting the organopolysiloxane resin (B1) having a three-dimensional network structure in Example 1 with the same number of parts of an organopolysiloxane resin (B7) having a three-dimensional network structure consisting of $(CH_3)_3SiO_{1/2}$ units, $(CH_3)(CH_2=CH)SiO_{2/2}$ units and $SiO_{4/2}$ units and having an M unit/Q unit ratio of 0.85, an alkenyl group content of 0.20 mol/100 g and a hydroxyl group content of 0.010 mol/100 g, Composition H was prepared in exactly the same way. Table 1 shows the results obtained when the same evaluations as in Example 1 were carried out.

Comparative Example 6

Aside from substituting the organopolysiloxane resin (B1) having a three-dimensional network structure in Example 1 with the same number of parts of an organopolysiloxane resin (B8) having a three-dimensional network structure consisting of $(CH_3)_3SiO_{1/2}$ units and $SiO_{4/2}$ units and having an M unit/Q unit ratio of 0.85, containing no alkenyl groups and having a hydroxyl group content of 0.010 mol/100 g, Composition I was prepared in exactly the same way. Table 1 shows the results obtained when the same evaluations as in Example 1 were carried out.

TABLE 1

|  | Example | | | Comparative Example | | | | | |
| --- | --- | --- | --- | --- | --- | --- | --- | --- | --- |
|  | 1 | 2 | 3 | 1 | 2 | 3 | 4 | 5 | 6 |
| Composition | A | B | C | D | E | F | G | H | I |
| Viscosity (mPa · s) | 30,000 | 35,000 | 26,000 | 38,000 | 65,000 | 20,000 | 1,300,000 | 35,000 | 39,000 |
| Hardness (Type A) | 43 | 44 | 40 | 44 | 45 | 32 | 65 | 58 | 26 |
| Tensile strength (MPa) | 6.1 | 6.5 | 4.9 | 6.1 | 6.0 | 6.2 | 4.5 | 8.1 | 3.6 |
| Elongation at break (%) | 220 | 230 | 280 | 230 | 220 | 320 | 150 | 190 | 400 |
| Tear strength (kN/m) | 16 | 15 | 12 | 16 | 16 | 20 | 8 | 5 | 4 |
| Combustion rate (mm/min) | 28 | 36 | 31 | 48 | 65 | 75 | Coating impossible | 30 | 32 |

The invention claimed is:

1. A flame-resistant airbag obtained by forming, on at least one side of an airbag base fabric, a cured film of an addition-curable liquid silicone rubber composition having a coating weight of 5 to 150 g/m$^2$, which composition comprises:
   (A) 100 parts by weight of an organopolysiloxane which includes at least two silicon-bonded alkenyl groups of 2 to 8 carbon atoms per molecule and is liquid at 25° C.;
   (B) from 5 to 100 parts by weight of a three-dimensional network-type organopolysiloxane resin in which from 0.05 to 0.15 mol/100 g of alkenyl groups are bonded solely to difunctional $R^1R^2SiO_{2/2}$ units (D units; in the formula, $R^1$ is an alkenyl group of 2 to 8 carbon atoms and $R^2$ is a group selected from alkyl groups of 1 to 8 carbon atoms, alkenyl groups of 2 to 8 carbon atoms and aryl groups of 6 to 12 carbon atoms), in which the ratio (M units/T and/or Q units) of monofunctional $R^3_3SiO_{1/2}$ units (M units; in the formula, each $R^3$ is independently a group selected from alkyl groups of 1 to 8 carbon atoms and aryl groups of 6 to 12 carbon atoms) to branched siloxane units which are trifunctional $R^3SiO_{3/2}$ units (T units; in the formula, $R^3$ is the same as above) and/or tetrafunctional $SiO_{4/2}$ units (Q units) is from 0.65 to 1.40, and in which the amount of hydroxyl groups is 0.040 mol/100 g or less;
   (C) from 0.1 to 50 parts by weight of a silica fine powder having a specific surface area according to the BET method of at least 50 m$^2$/g;
   (D) an organohydrogenpolysiloxane containing at least two silicon-bonded hydrogen atoms per molecule, in an amount such that the number of silicon-bonded hydrogen atoms included on a molecule of component (D) per silicon-bonded alkenyl group in components (A) and (B) combined is from 1 to 10;
   (E) an effective amount of a platinum family metal catalyst as a hydrosilylation reaction catalyst; and
   (F) from 0.1 to 10 parts by weight an organosilicon compound having on the molecule, as adhesion-promoting functional groups, an epoxy group and a silicon-bonded alkoxy group.

2. The flame-resistant airbag of claim 1, wherein the addition-curable liquid silicone rubber composition further comprises, as component (G): from 0.1 to 5 parts by weight, per 100 parts by weight of component (A), of at least one type of co-condensation catalyst selected from organotitanium compounds and organozirconium compounds.

3. The flame-resistant airbag of claim 1, wherein component (C) is a surface-hydrophobized silica fine powder.

4. The flame-resistant airbag of claim 1 which has a combustion rate in the combustion test for airbags of Federal Motor Vehicle Safety Standard (FMVSS) No. 302 that is 40 mm/min or less.

5. A method of manufacturing flame-resistant airbags, comprising the steps of:
   preparing an addition-curable liquid silicone rubber composition comprising
   (A) 100 parts by weight of an organopolysiloxane which contains at least two silicon-bonded alkenyl groups of 2 to 8 carbon atoms per molecule and is liquid at 25° C.,
   (B) from 5 to 100 parts by weight of a three-dimensional network-type organopolysiloxane resin in which from 0.05 to 0.15 mol/100 g of alkenyl groups are bonded solely to difunctional $R^1R^2SiO_{2/2}$ units (D units; in the formula, $R^1$ is an alkenyl group of 2 to 8 carbon atoms and $R^2$ is a group selected from alkyl groups of 1 to 8 carbon atoms, alkenyl groups of 2 to 8 carbon atoms and aryl groups of 6 to 12 carbon atoms), in which the ratio (M units/T and/or Q units) of monofunctional $R^3_3SiO_{1/2}$ units (M units; in the formula, each $R^3$ is independently a group selected from alkyl groups of 1 to 8 carbon atoms and aryl groups of 6 to 12 carbon atoms) to branched siloxane units which are trifunctional $R^3SiO_{3/2}$ units (T units; in the formula, $R^3$ is the same as above) and/or tetrafunctional $SiO_{4/2}$ units (Q units) is from 0.65 to 1.40, and in which the amount of hydroxyl groups is 0.040 mol/100 g or less,
   (C) from 0.1 to 50 parts by weight of a silica fine powder having a specific surface area according to the BET method of at least 50 m$^2$/g,
   (D) an organohydrogenpolysiloxane containing at least two silicon-bonded hydrogen atoms per molecule, in an amount such that the number of silicon-bonded hydrogen atoms included on a molecule of component (D) per silicon-bonded alkenyl group in components (A) and (B) combined is from 1 to 10,
   (E) an effective amount of a platinum family metal catalyst as a hydrosilylation reaction catalyst, and
   (F) from 0.1 to 10 parts by weight of an organosilicon compound having on the molecule, as adhesion-promoting functional groups, an epoxy group and a silicon-bonded alkoxy group;

coating the composition onto at least one side of an airbag base fabric to a coating weight of from 5 to 150 g/m²; and heat-curing the base fabric coated with the composition.

6. The flame-resistant airbag manufacturing method of claim 5, wherein the addition-curable liquid silicone rubber composition further comprises, as component (G): from 0.1 to 5 parts by weight, per 100 parts by weight of component (A), of at least one type of co-condensation catalyst selected from organotitanium compounds and organozirconium compounds.

7. The flame-resistant airbag manufacturing method of claim 5 which includes the step of using, as component (C) in the addition-curable liquid silicone rubber composition preparation step, a surface-hydrophobized silica fine powder that is already surface-treated or a surface-hydrophobized silica fine powder that is surface-treated in the preparation step.

8. The flame-resistant airbag manufacturing method of claim 5, wherein the addition-curable liquid silicone rubber composition has a viscosity at 25° C., as measured by the method described in JIS K 7117-1:1999, of from 1,000 to 1,000,000 mPa·s.

9. An addition-curable liquid silicone rubber composition for flame-resistant airbags, comprising:
(A) 100 parts by weight of an organopolysiloxane which includes at least two silicon-bonded alkenyl groups of 2 to 8 carbon atoms per molecule and is liquid at 25° C.;
(B) from 5 to 100 parts by weight of a three-dimensional network-type organopolysiloxane resin in which from 0.05 to 0.15 mol/100 g of alkenyl groups are bonded solely to difunctional $R^1R^2SiO_{2/2}$ units (D units; in the formula, $R^1$ is an alkenyl group of 2 to 8 carbon atoms and $R^2$ is a group selected from alkyl groups of 1 to 8 carbon atoms, alkenyl groups of 2 to 8 carbon atoms and aryl groups of 6 to 12 carbon atoms), in which the ratio (M units/T and/or Q units) of monofunctional $R^3_3SiO_{1/2}$ units (M units; in the formula, each $R^3$ is independently a group selected from alkyl groups of 1 to 8 carbon atoms and aryl groups of 6 to 12 carbon atoms) to branched siloxane units which are trifunctional $R^3SiO_{3/2}$ units (T units; in the formula, $R^3$ is the same as above) and/or tetrafunctional $SiO_{4/2}$ units (Q units) is from 0.65 to 1.40, and in which the amount of hydroxyl groups is 0.040 mol/100 g or less;
(C) from 0.1 to 50 parts by weight of a silica fine powder having a specific surface area according to the BET method of at least 50 m²/g;
(D) an organohydrogenpolysiloxane containing at least two silicon-bonded hydrogen atoms per molecule, in an amount such that the number of silicon-bonded hydrogen atoms included on a molecule of component (D) per silicon-bonded alkenyl group in components (A) and (B) combined is from 1 to 10;
(E) an effective amount of a platinum family metal catalyst as a hydrosilylation reaction catalyst; and
(F) from 0.1 to 10 parts by weight of an organosilicon compound having on the molecule, as adhesion-promoting functional groups, an epoxy group and a silicon-bonded alkoxy group.

10. The addition-curable liquid silicone rubber composition for flame-resistant airbags of claim 9, further comprising, as component (G): from 0.1 to 5 parts by weight, per 100 parts by weight of component (A), of at least one type of co-condensation catalyst selected from organotitanium compounds and organozirconium compounds.

11. The addition-curable liquid silicone rubber composition for flame-resistant airbags of claim 9, wherein the addition-curable liquid silicone rubber composition has a viscosity at 25° C., as measured by the method described in JIS K 7117-1:1999, of from 1,000 to 1,000,000 mPa·s.

* * * * *